United States Patent [19]

Smietana

[11] Patent Number: 5,099,875
[45] Date of Patent: Mar. 31, 1992

[54] FLUID FLOW REGULATOR

[75] Inventor: James M. Smietana, West Seneca, N.Y.

[73] Assignee: Moog Controls, Inc., East Aurora, N.Y.

[21] Appl. No.: 651,183

[22] Filed: Feb. 6, 1991

[51] Int. Cl.$^5$ .............................................. F16K 17/24
[52] U.S. Cl. ..................................................... 137/504
[58] Field of Search ........................... 137/501, 498, 504

[56] References Cited

U.S. PATENT DOCUMENTS

| | | | |
|---|---|---|---|
| 3,170,481 | 2/1965 | Presnell | 137/504 |
| 3,381,708 | 5/1968 | Chenoweth | 137/504 |
| 3,630,228 | 12/1971 | Turner et al. | |
| 3,752,183 | 8/1973 | Griswold | 137/504 |
| 4,080,993 | 3/1978 | Lind | 137/504 |
| 4,112,978 | 9/1978 | Olbrich et al. | 137/504 X |

*Primary Examiner*—Stephen M. Hepperle
*Attorney, Agent, or Firm*—Wall and Roehrig

[57] ABSTRACT

A flow limiter for use in association with a control valve for minimizing flow losses in an actuator control system to provide unrestricted control over the flow up to the desired maximum flow quantity value. A cylindrical sleeve is mounted within a housing and a piston is slidably contained within the sleeve to establish a variable chamber between the front wall of the piston and the back wall of the sleeve. A series of circumferentially spaced metering ports are contained in the variable chamber which are opened and closed by the piston. A control orifice is formed in the front wall of the piston and a biasing spring is arranged to act on the piston outside the flow path of the fluid to normally hold the piston in a home position wherein the metering ports are fully opened. The spring allows the piston to move toward a second position when the pressure over the orifice reaches a predetermined value, thus closing the metering ports to maintain the flow at a desired flow. The size of the control orifice to minimize the pressure drop over the orifice when the flow is below the desired maximum value.

9 Claims, 2 Drawing Sheets 5,099,875

FLUID FLOW REGULATOR

BACKGROUND OF THE INVENTION

This invention relates generally to a flow control system for use in an actuator and, in particular, to a flow limiter for use in conjunction with a control valve in an actuator control system.

Actuators are used in motion simulators to control the motion of a load under simulation. Typically, the actuator will include a drive cylinder that houses a piston and a piston rod which connects the piston to the load. Fluid is routed from one side of the piston to the other by means of a control valve to either extend or retract the piston rod and thus move the load. Typically, the simulator will employ a plurality of actuators that work together to simulate a full range of complex movements. During motion simulation, the actuators generally are moving at different velocities and the actuator rods are moving in different directions.

One of the major problems associated with motion simulators is the overspeeding of the load as the actuator is being extended. This is caused by the inertia of the load or when the stress on the rod changes dramatically from compression to tension because of the offsetting of the load. In order to prevent overspeeding, a flow limiter is placed in the flow control line in series with the control valve of each actuator to limit the rate of fluid flow that can be returned by the control valve to the back side of the actuator piston. Most prior art flow limiters, however, have been found to be unacceptable for use in this type of control system primarily because they produce an unacceptable pressure loss in the flow circuit which adversely effects the performance of the associated control valve and the operation of the actuator. Furthermore, most prior art flow limiters are designed to handle flows in one direction only. The flow of fluids through these devices in a reverse direction is usually restricted, which again seriously effects the operation and performance of the overall system. Turner et al., in U.S. Pat. No. 3,630,228, discloses a flow regulator for providing a constant rate of flow in a jet engine water injection system. Here, the flow of fluid is in one direction only. Turner et al. employs a piston and control spring mechanism to open or close a throttling valve in response to changes in pressure sensed over an orifice placed in the flow stream. The control spring is positioned in the flow immediately adjacent to the sensing orifice while the throttling valve is some distance away. The spring produces an unwanted restriction in the flow and also acts as an uncontrolled orifice that adversely effects the performance of the device. The response of the Turner et al. device is also relatively slow because of the remote positioning of the throttling valve in regard to the sensing orifice. As a consequence, the performance of the device under certain operating conditions can change as the throttle attempts to adjust to changes in flow conditions.

OBJECTS AND SUMMARY OF THE INVENTION

It is therefore a primary object of the present invention to improve flow limiting devices and, in particular, flow limiting devices that are used in association with control valves in actuator systems.

Yet a further object of the present invention is to minimize the pressure drop across a flow limiter.

It is a further object of the present invention to provide a flow limiter that is suitable for use with a control valve for regulating the motion of an actuator to prevent the actuator from overspeeding. while at the same time minimizing the pressure loss in the control system.

A still further object of the present invention is to provide a flow limiter for use in association with a control valve which allows the control valve to respond rapidly and smoothly to changing load demands within a desired flow range.

Another object of the present invention is to provide a flow limiter having a non-tortuous flow path therethrough that is free from flow restriction that might impede flow.

Yet another object of the present invention is to provide a flow limiter which can pass a desired flow range in either direction with a minimum loss of pressure.

These and other and further objects of the invention are attained by a flow limiter that is connected into a flow control line of an actuator in series with a control valve. The limiter includes a housing having a straight through flow path between a wide open inlet and a wide open outlet. A sleeve is stationarily mounted inside the housing which contains a back wall facing the housing outlet and an unrestricted opening facing the housing inlet. The sleeve has a plurality of circumferentially spaced metering ports passing radially through its side wall adjacent to the back wall. A piston is slidably mounted within the sleeve which has an axially extended passage that faces the inlet to the housing to provide full entry for fluids that are admitted into the housing through the inlet. A control orifice is mounted in the back of the passage which faces the back wall of the sleeve. The piston is arranged to move between a first position wherein the metering ports are fully opened and a second position wherein the piston at least partially closes the metering ports to restrict the flow of fluid passing through the housing. A biasing spring is located outside flow path within the housing to exert a force on the piston to urge the piston into the first position. The spring force is set so that the piston moves toward the second position when the pressure difference across the control orifice reaches a predetermined value to maintain the flow through the limiter at or below a desired maximum level. The pressure drop across the control orifice is relatively small in comparison to that of the total drop through the piston passage. This, coupled with the uninterrupted flow path through the limiter, minimizes the pressure drop across the limiter while at the same time maximizing the quantity of flow therethrough.

BRIEF DESCRIPTION OF THE DRAWINGS

For a better understanding of these and other objects of the invention, reference shall be made to the following detailed description of the invention which is to be read in association with the following drawings, wherein.

DETAILED DESCRIPTION OF THE INVENTION

Figure 1:
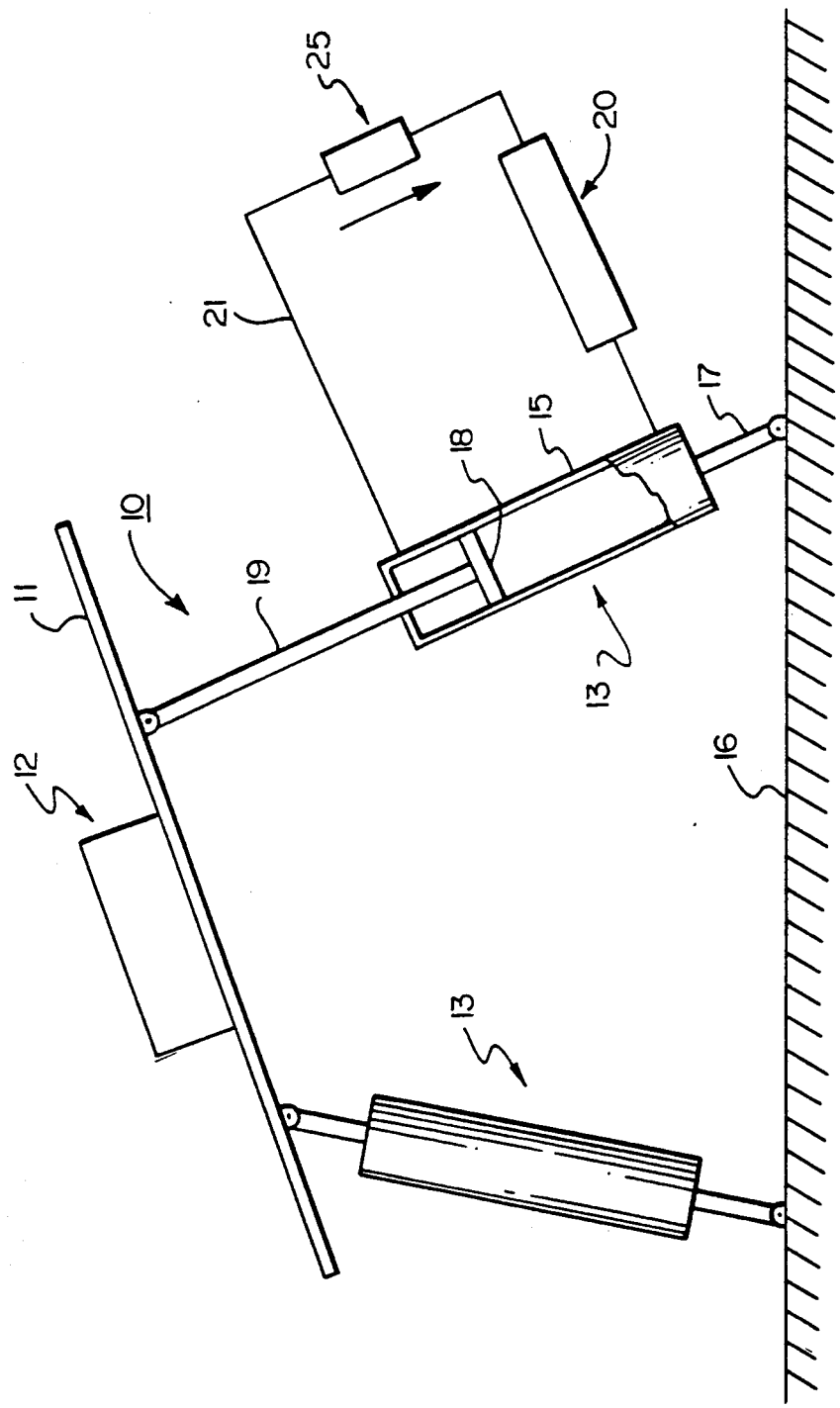
FIG. 1 is a diagrammatic view showing a motion simulator under the control of major actuators.

Turning initially to FIG. 1, there is shown in diagrammatic form a motion simulator, generally referenced 10, of the type typically used in the aviation industry to simulate the motion of an aircraft in flight. The simulator includes a platform 11 upon which is situated a load 12 which is typically a crew compartment. A plurality of "major" actuators 13—13 are connected to the platform which, upon command, impart a desired motion to the load. Although two major actuators are shown, any number of actuators may be used in practice to simulate the desired motion.

Each major actuator includes a cylinder 15 that is pivotally connected to a base 16 by means of a link 17. A drive piston 18 is slidably mounted within the cylinder and the piston rod 19 is pivotally connected to the platform. The actuator motion is controlled by a servo control valve unit 20 that routes hydraulic fluid from one side of the drive piston to the other via a control line 21. Such control units are well-known and widely used in the industry to provide extremely sensitive control over the movement of the actuator piston. As noted above, simulator actuators of this type are, however, subject to overspeeding which can be caused by inertia or by the force on the piston rod changing from compression to tension because of the positioning of the load.

In the present system, a flow limiter 25 is placed in the flow line 21 in series with the control valve unit 20. As will be explained in greater detail below, the limiter operates to hold the quantity of fluid moving through the line at or below a predetermined maximum level at which overspeeding of the load occurs. In addition, the flow limiter is specifically designed to minimize the pressure drop over the device when the flow through the line is below the predetermined maximum level. Any drop in pressure over the flow limiter reduces the effective control that the system can exercise over the load. By minimizing the pressure loss in the flow limiter, increased response and control is afforded over the actuator thereby greatly enhancing the overall control afforded over the load.

Figure 2:
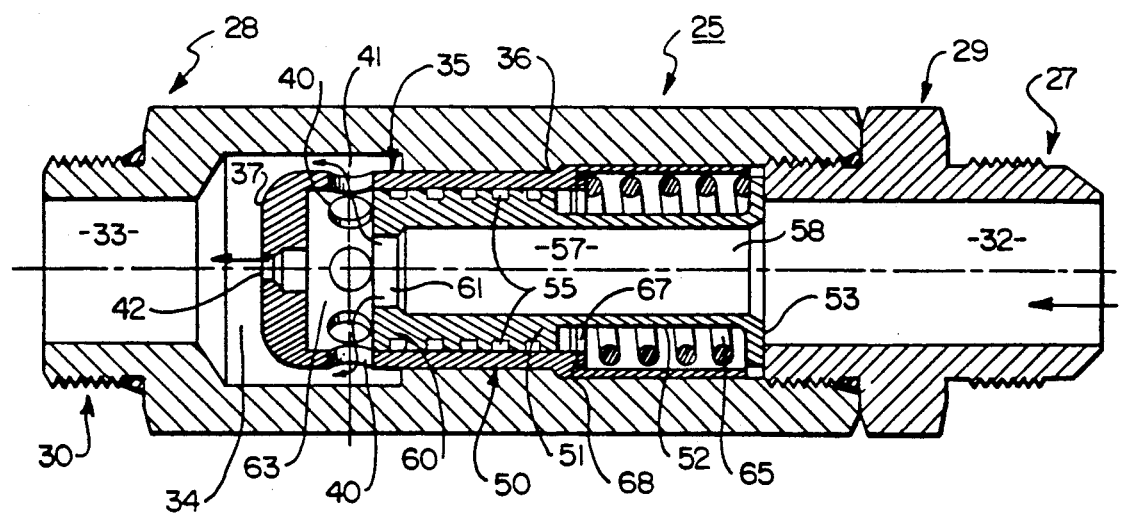
FIG. 2 is an enlarged side elevation of a flow limiter embodying the teachings of the present invention.

As illustrated in FIG. 2, the inlet end of the limiter is provided with a threaded adaptor 29. The opposite or outlet end 30 of the housing is also threaded so that the housing can be threaded into the control line 21 (FIG. 1) using suitable female connectors (not shown). Fluid moving through the line in the direction indicated in FIG. 1 enters the limiter at the inlet region 32 and exits via outlet region 33. A straight through flow cavity 34 is furnished within the housing that is axially aligned with the inlet and outlet regions. The diameters of the inlet and outlet regions are such that they provide full unrestricted entry and exit to the fluid moving through the control line in either direction.

A cylindrical sleeve 35 is compressed into the housing cavity into abutting contact against a shoulder 36 formed therein. The sleeve includes a back wall 37 which faces the housing outlet 33. The opposite end of the sleeve, which faces the housing inlet, is fully opened. A plurality of circumferentially spaced metering ports 40—40 are formed in the side wall of the sleeve immediately behind the back wall. The metering ports pass radially through the side wall and empty into an expanded chamber 41 formed in the housing opening. A stabilizing orifice 42 is provided in the back wall of the sleeve, the purpose of which shall be explained in greater detail below.

A piston 53 slidably contained within the sleeve 35. The piston includes a piston head 51 having a depending shank 52 that terminates in a radially expanded end flange 53. A series of axially spaced grooves 55—55 are formed in the piston head to provide a pressure balanced sliding seal between the head and the inner wall of the sleeve. The piston contains an axially disposed flow passage 57 which also has a full area entrance region 58 that faces the housing inlet 32. The head end of the piston contains an end wall 60 through which a control orifice 61 passes. Fluid entering the passage 57 from the inlet 32 passes through the orifice 61 into a variable chamber 63 formed between the end wall of the piston and the end wall of the sleeve. As shown in FIG. 2, the metering ports 40—40 are located within this variable chamber and are adapted to be opened and closed by the piston head as it moves between a first home position as illustrated, and a second position wherein the metering ports are at least partially closed. A relatively small pressure drop is established over the orifice which increases as the quantity of flow through the limiter increases.

A biasing spring 65 surrounds the shank of the piston and is arranged to urge the piston toward the housing inlet against the end face of the threaded connector 29. In assembly, the spring is compressed between a washer 67 seated against a shoulder 68 and the piston end flange 53. The washer provides a secure seat for the spring as well as a means for adjusting the spring force exerted upon the piston. A washer of greater or lesser width can be substituted for the washer shown to correspondingly increase or decrease the spring force. In order to keep the spring stresses relatively low, the size of the spring must be correspondingly large. The spring acts as a feedback mechanism in the system providing a force which retards the piston from moving to the left as seen in FIG. 2 when the pressure difference over the control orifice reaches a predetermined value. The quantity of flow through the orifice, and thus through the limiter, is related to the pressure drop over the orifice by the following relationship:

$$Q = kA(P)^{\frac{1}{2}} \quad (1)$$

where:
k is a constant relating to the fluid in the flow,
A is the area of the orifice facing the flow, and
P is the pressure drop over the orifice.

Figure 3:
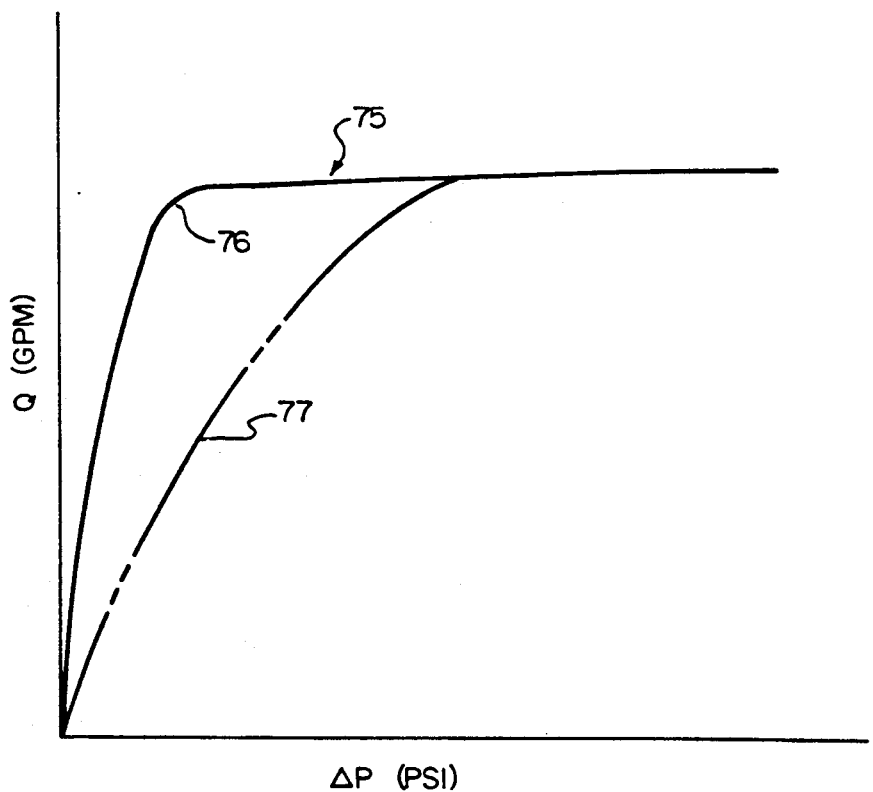
FIG. 3 is a graphic presentation relating pressure drop over the flow limiter shown in FIG. 2 to the quantity of flow passing through the limiter.

In order to minimize the pressure loss in the limiter, the area of the control orifice is maximized. This allows the orifice to carry out its desired control function which will be explained below while placing a minimum amount of restriction in the flow being controlled. The spring rate is matched to the pressure drop over the orifice to maintain the piston in the home position when the flow through the orifice is below a certain quantity. When this quantity of flow is exceeded, the pressure exerted on the piston by the incoming flow overcomes the spring pressure and the piston is forced to the left, as shown in FIG. 2. This closes the metering ports under controlled conditions and prevents the quantity of flow passing through the limiter from exceeding a desired maximum value. The plot of the present limiter is shown graphically by the curve 75 in FIG. 3 wherein the quantity of flow (Q) is plotted against the pressure drop (P) across the control orifice. As can be seen, the slope of the curve is relatively steep and is governed primarily by the size of the control orifice. As noted, the spring 65 (FIG. 2) is designed to permit the flow to approach a maximum desired value before the spring begins to move the piston over the metering ports. This occurs within the knee region 76 of the curve. The spring continues to move the piston in response to the sensed pressure difference to hold the flow at the desired maximum value. Curve 77 depicts the typical response of a prior art flow limiter. As can be seen, the slope of the response curve is relatively flat when compared to that of the present device indicating that a great deal more pressure is dropped over the prior art device for the same flow rating than that of the present invention. Use of the prior art devices in an actuator control system of the type illustrated in FIG. 1 would therefore seriously effect the operation and response of the actuator.

In the present embodiment of the invention, eight equally spaced metering ports are employed which, when fully opened, will permit an unrestricted flow of fluid to pass therethrough in either direction. As illustrated in FIG. 1, fluid that is being returned to the top side of the actuator piston must therefore flow through in a reverse direction into the housing through the outlet 33 and out of the housing through the inlet 32. During the reverse flow period, the piston is forced back under the pressure of the spring 65 and the flow into the home position. However, because of the unrestricted flow path through the housing, the limiter is fully able to handle the reverse flow with a minimum amount of pressure loss.

The small stabilizing orifice 42 noted above is designed to prevent flow instabilities from occurring at low flow rates and/or at high flow pressures without impeding the operation of the limiter.

While this invention has been explained with reference to the structure disclosed herein, it is not confined to the details as set forth and this application is intended to cover any modifications and changes as may come within the scope of the following claims.

What is claimed is:

1. Flow limiting apparatus for minimizing the pressure loss in a flow control system adapted to be connected into a flow control line in series with an actuator control valve that includes:
    a housing having an inlet and an outlet axially aligned with a flow cavity,
    a sleeve having a cylindrical side wall that has an open end facing the inlet and a back wall facing said outlet, said sleeve further including at least one radially disposed metering port,
    a piston means slidably mounted inside the sleeve having a flow cavity axially disposed therein, said cavity having an open entrance end facing said inlet and a back wall adjacent the back wall of said sleeve with a control orifice formed therein for producing a pressure drop in the flow,
    said axial flow cavity, inlet, outlet, and metering port being sized and positioned relative to each other to minimize pressure drop through the flow limiting apparatus,
    said piston means being movable within said sleeve between a first position wherein said metering port is fully opened and a second position wherein said port is at least partially closed to limit the amount of flow through said housing,
    a biasing means located outside the fluid flow path through said housing that exerts a force on said piston means to urge said piston means into said first position, said biasing force being related to the pressure drop over the orifice so that the piston means is moved toward said second position when the pressure drop over the piston reaches a predetermined value to close said metering port to hold the amount of flow through the housing at or below a desired maximum value.

2. The flow limiter of claim 1 wherein the control orifice has a diameter that is about equal to the flow diameter of the flow cavity to minimize the pressure loss thereover.

3. The flow limiter of claim 2 wherein the area of the inlet and the area of the outlet are capable of passing the full flow carried in the control line in either direction through said housing.

4. The flow limiter of claim 1 wherein the biasing means is a coil spring that encircles a portion of the piston means and acts between said housing and the piston means to urge the piston into said first position.

5. The flow limiter of claim 4 that further includes means to adjust the force that said spring exerts on said piston means.

6. The flow limiter of claim 5 wherein said means to adjust the spring force is a replaceable washer positioned between the spring and the housing.

7. The flow limiter of claim 1 wherein the sleeve contains a plurality of circumferentially spaced metering ports located adjacent to the back wall thereof.

8. The flow limiter of claim 4 wherein said piston means further includes a piston head slidably contained in the sleeve, a shank that passes out of the sleeve through the open end thereof, and a radial flange at the distal end of the shank for engaging one end of said spring.

9. The flow limiter of claim 1 having threaded means at each end of the housing for connecting the housing into the flow control line.

* * * * *